United States Patent
Tonomura et al.

(10) Patent No.: US 10,206,249 B2
(45) Date of Patent: Feb. 12, 2019

(54) FLUID HEATING DEVICE

(71) Applicant: TOKUDEN CO., LTD., Kyoto-shi, Kyoto (JP)

(72) Inventors: Toru Tonomura, Otsu (JP); Yasuhiro Fujimoto, Kyoto (JP); Sachio Tamaki, Kyoto (JP)

(73) Assignee: TOKUDEN CO., LTD., Kyoto-shi, Kyoto (JP)

( * ) Notice: Subject to any disclaimer, the term of this patent is extended or adjusted under 35 U.S.C. 154(b) by 573 days.

(21) Appl. No.: 14/858,998

(22) Filed: Sep. 18, 2015

(65) Prior Publication Data
US 2016/0088686 A1 Mar. 24, 2016

(30) Foreign Application Priority Data

Sep. 19, 2014 (JP) ................................. 2014-192018
Oct. 27, 2014 (JP) ................................. 2014-217984

(51) Int. Cl.
| | | |
|---|---|---|
| H05B 6/10 | (2006.01) | |
| H05B 6/02 | (2006.01) | |
| F24H 1/22 | (2006.01) | |
| H05B 6/44 | (2006.01) | |
| F22B 1/28 | (2006.01) | |
| F24H 1/16 | (2006.01) | |

(Continued)

(52) U.S. Cl.
CPC ............. *H05B 6/108* (2013.01); *F16L 53/34* (2018.01); *F22B 1/281* (2013.01); *F24H 1/101* (2013.01); *F24H 1/102* (2013.01); *F24H 1/162* (2013.01); *H05B 6/44* (2013.01); *F24H 2250/08* (2013.01)

(58) Field of Classification Search
CPC .......... F22B 1/281; F24H 1/162; F24H 1/102; F24H 1/101; F24H 2250/08; F16L 53/34; H05B 6/44; H05B 6/108

USPC ............... 219/628–632, 602, 635, 660, 672; 392/470, 477, 465, 486, 493, 481
See application file for complete search history.

(56) References Cited

U.S. PATENT DOCUMENTS

| | | | | |
|---|---|---|---|---|
| 4,791,262 A | * | 12/1988 | Ando ..................... | H05B 6/108 219/630 |
| 6,181,874 B1 | | 1/2001 | Ireland et al. | |
| 2001/0017296 A1 | | 8/2001 | Katayama et al. | |

FOREIGN PATENT DOCUMENTS

| | | |
|---|---|---|
| CN | 202068606 U | 12/2011 |
| CN | 103245048 A | 8/2013 |
| CN | 203413279 U | 1/2014 |

(Continued)

OTHER PUBLICATIONS

European Patent Office, Extended European Search Report Issued in Patent Application No. 15184402.4, dated Feb. 19, 2016, Germany, 8 pages.

(Continued)

*Primary Examiner* — Quang Van
(74) *Attorney, Agent, or Firm* — Alleman Hall Creasman & Tuttle LLP

(57) ABSTRACT

This invention provides a fluid heating device that is free from breakage even though a conductor tube is transformed due to being heated. Concretely, this invention is provided with an electrical connecting member that constitutes a short circuit by electrically connecting each of required portions of the conductor tube, and uses the electrical connecting member that is transformable in accordance with a transformation resulting from a temperature change of the conductor tube.

5 Claims, 5 Drawing Sheets

(51) Int. Cl.
*F24H 1/10* (2006.01)
*F16L 53/34* (2018.01)

(56) References Cited

FOREIGN PATENT DOCUMENTS

| | | |
|---|---|---|
| CN | 205245118 U | 5/2016 |
| EP | 1784051 A1 | 5/2007 |
| GB | 226207 A | 7/1925 |
| GB | 422852 A | 1/1935 |
| GB | 2219715 A | 12/1989 |
| JP | S49033985 B | 9/1974 |
| JP | H04230987 A | 8/1992 |
| JP | H08149788 A | 6/1996 |
| JP | H09178103 A | 7/1997 |
| JP | 2010071624 A | 4/2010 |
| JP | 2012052707 A | 3/2012 |
| JP | 2012241952 A | 12/2012 |

OTHER PUBLICATIONS

Japan Patent Office, Office Action Issued in Japanese Application No. 2014-217984, dated Dec. 26, 2017, 6 pages. (Submitted with English Translation of Office Action).

The State Intellectual Property Office of the People's Republic of China, First Office Action Issued in Chinese Application No. 201510566262.9, dated Jul. 2, 2018, 11 pages. (Submitted with English Translation of First Office Action).

\* cited by examiner

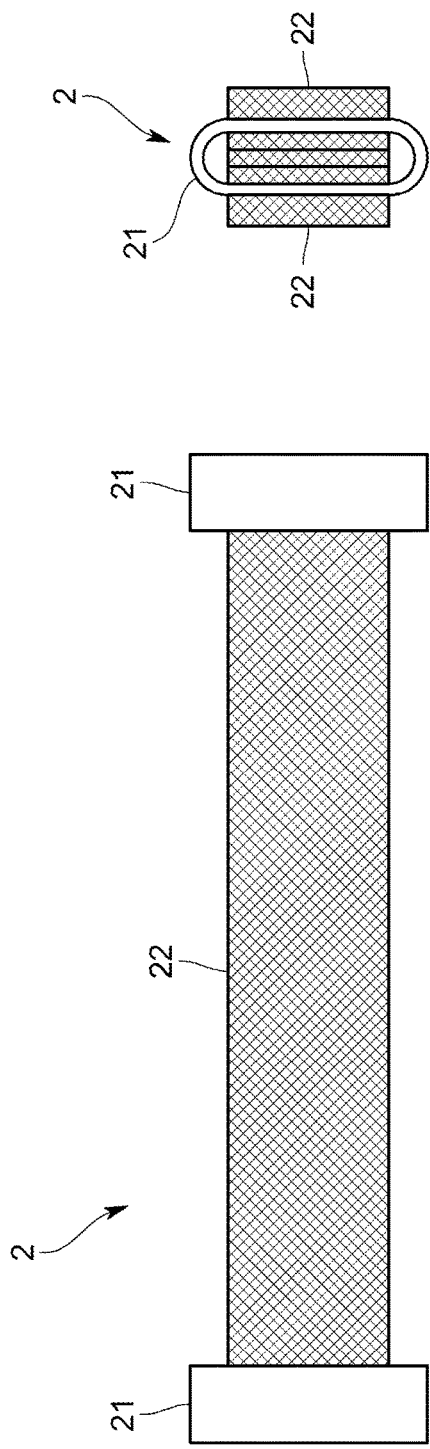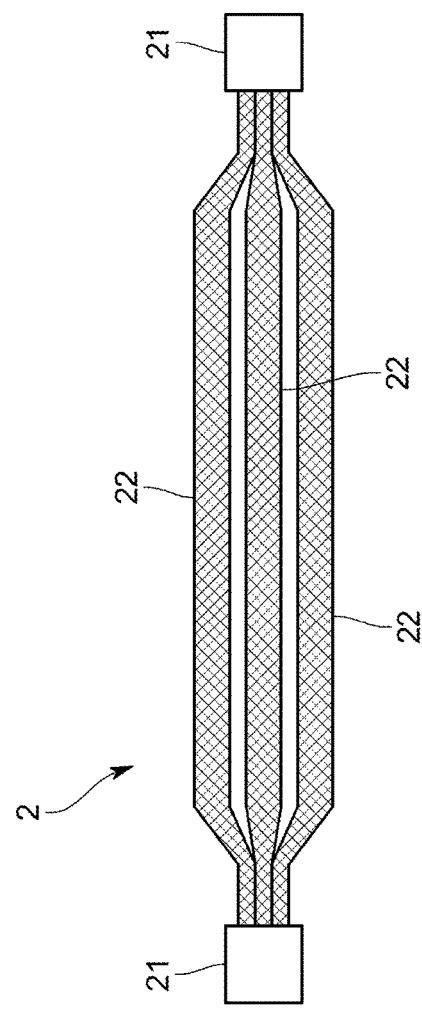

| ELECTRIC CONNECTING MEMBER | ELECTRIC CURRENT VALUE (A) |
|---|---|
| a | 296 |
| b | 276 |
| c | 101 |
| d | 131 |
| e | 28 |
| f | 108 |
| g | 118 |
| h | 198 |
| i | 37 |
| j | 78 |
| k | 39 |

FLUID HEATING DEVICE

FIELD OF THE ART

This invention relates to a fluid heating device that applies heat to a fluid that flows in a conductor tube of a helical shape by applying induction heat or electrical heat to the conductor tube.

BACKGROUND ART

A conventionally known fluid heating device is shown in the patent document 1 wherein a plurality of rounds of a helical conventional tube which form a secondary coil are electrically connected by the use of an electrical connecting member that extends in an axial direction of the helical shape by means of welding or the like so as to constitute a short circuit so that electrical reactance is reduced and heating efficiency is improved.

If induction heat or electrical heat is applied to the helical conductor tube, a larger electric current flows in an inner circumference side of the conductor tube with a shorter length and a lower electrical resistivity than in an outer circumference side thereof, and a temperature in the inner circumference side becomes higher than that in the outer circumference side. As a result of this, thermal expansion becomes greater in the inner circumference side of the conductor tube than in the outer circumference side so that a mutual disposition of the conductor tube changes in a direction of unwinding the helical shape of the conductor tube.

In addition, since a temperature of an exit side of the fluid becomes higher than that of an entrance side, a diameter in the exit side becomes bigger so that a shape of the helical conductor tube viewed from the front changes into a trapezoid shape.

However, if the electrical connecting member is fixed to required positions of the conductor tube similar to in the conventional fluid heating device, considerable stress is generated when the conductor tube is about to change its shape and may cause an accumulation of fatigue or breakage of the conductor tube or the electrical connecting member or at a portion where the conductor tube is fixed to the electrical connecting member.

PRIOR ART DOCUMENTS

Patent Document

Patent document 1: Japanese Unexamined Patent Application Publication No. 2010-71624

DISCLOSURE OF THE INVENTION

Problems to be Solved by the Invention

The presently claimed invention is for solving all of the above-mentioned problems, and a main object of this invention is to provide a fluid heating device wherein required portions of a conductor tube are electrically connected by an electrical connecting member so as to constitute a short circuit to reduce both an electrical reactance and possibility of breakage even though the conductor tube is transformed due to heating.

Means to Solve the Problems

More specifically, a fluid heating device in accordance with this invention is a fluid heating device that applies heat to a fluid that flows in a conductor tube of a helical shape by applying induction heat or electrical heat to the conductor tube, and is characterized by an electrical connecting member that constitutes a short circuit by electrically connecting each of required portions of which the conductor tube is comprised and the electrical connecting member is transformable in accordance with a transformation resulting from a temperature change of the conductor tube.

More concretely, the electrical connecting member can be mounted on the conductor tube along an axial direction of the helical shape.

It is preferable that a cross-sectional area and a number of connections of the electrical connecting member are set based on a value of an electric current that flows in the electrical connecting member for every portion where the electrical connecting member is mounted. The value of the electric current that flows in each of the electrical connecting members largely differs depending on a state of a magnetic coupling with an input side winding or due to a difference of impedance. If the cross-sectional area and the number of connections of the electrical connecting member are set in accordance with the value of the electric current, it is possible both to prevent excessive heating and to avoid selecting an excess cross-sectional area and number of connections.

As a preferable embodiment of the electrical connecting member, the electrical connecting member may be formed by the use of a metal mesh. In accordance with this arrangement, since the metal mesh easily transforms not only in the longitudinal direction but also in the transverse direction, it is possible to sufficiently cope with a contingent transformation of the conductor tube.

As a further different preferable embodiment of the electrical connecting member, the electrical connecting member may be formed by the use of a metal plate whose middle area is provided with a bent portion. In accordance with this arrangement, it is possible not only to easily provide mobility but also to easily secure a large conduction cross-sectional area.

In a case that the conductor tube produces superheated vapor by applying heat to the fluid, since the temperature rise is great so that the conductor tube transforms largely, the effect of this invention is especially remarkable.

Effect of the Invention

In accordance with this invention having the above-mentioned arrangement, since the electrical connecting member transforms in accordance with a transformation of the conductor tube resulting from the temperature change of the conductor tube, it is possible to prevent accumulation of fatigue for the conductor tube or the electrical connecting member or at a portion where the conductor tube is fixed to the electrical connecting member, resulting in prevention of breakage.

BRIEF DESCRIPTION OF THE DRAWINGS

FIGS. 3A-3C are a front view, a bottom view, and a side view showing an electrical connecting member of this embodiment.

BEST MODES OF EMBODYING THE INVENTION

One embodiment of a fluid heating device 100 in accordance with this invention will be explained with reference to drawings.

Figure 1:
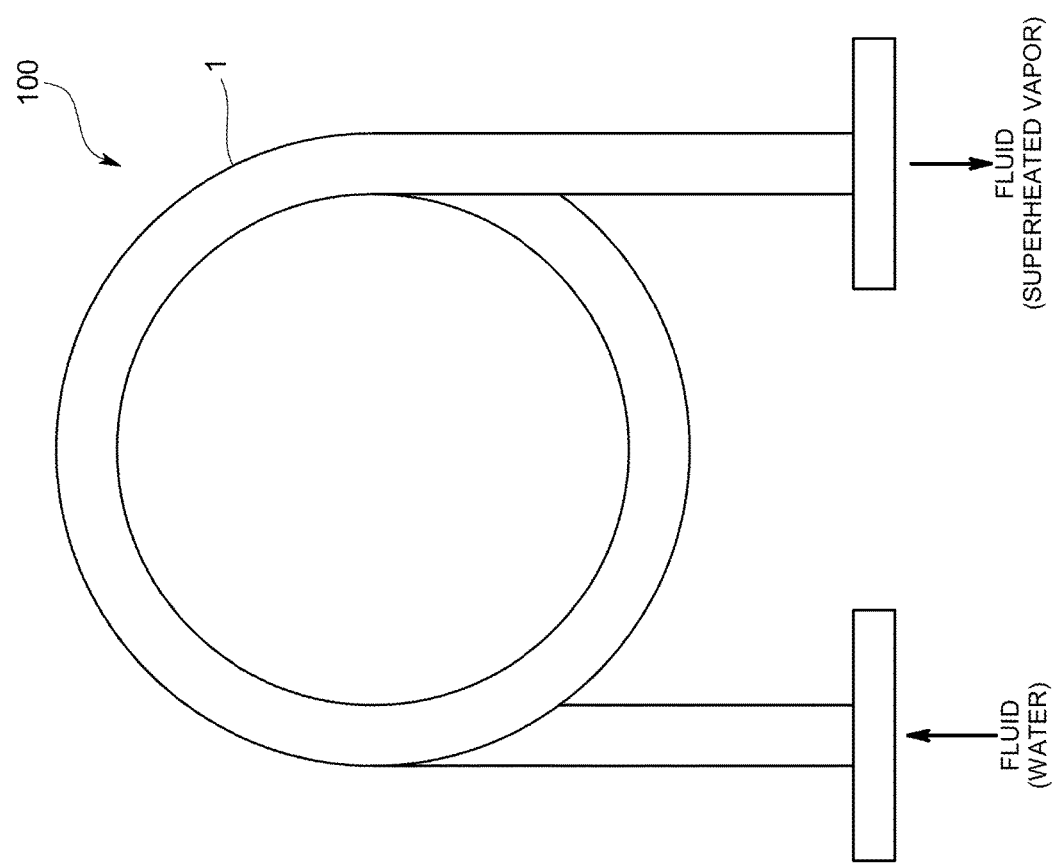
FIG. 1 is a front view mainly showing a conductor tube of a fluid heating device in accordance with one embodiment of this invention.

The fluid heating device 100 has a primary coil (not shown in drawings) that winds around an iron core and a secondary coil (refer to FIG. 1 and FIG. 2) comprising a helical conductor tube 1 that winds along the primary coil around an outer surface or an inner surface of the primary coil or between the primary coils, and applies heat to a fluid that circulates inside of the conductor tube 1 that constitutes the secondary coil by means of induction heating of the conductor tube 1. On one end part of the conductor tube 1 that constitutes the secondary coil is formed an introduction port to which an outer pipe to supply the secondary coil with the fluid is connected. On the other end part of the conductor tube 1 is formed a discharge port to which the outer pipe to discharge the heated fluid outside is connected.

The fluid heating device 100 applies heat to water as the fluid, and is used as a superheated vapor producing device that produces a superheated vapor whose temperature is 100° C. or more (200° C.~2000° C.) by applying heat to the water by means of the conductor tube 1. However, the temperature to be heated or an object fluid to be heated is not limited to this. For example, the superheated vapor may be produced by applying heat to a saturated vapor produced outside by the use of the conductor tube 1.

Figure 2:
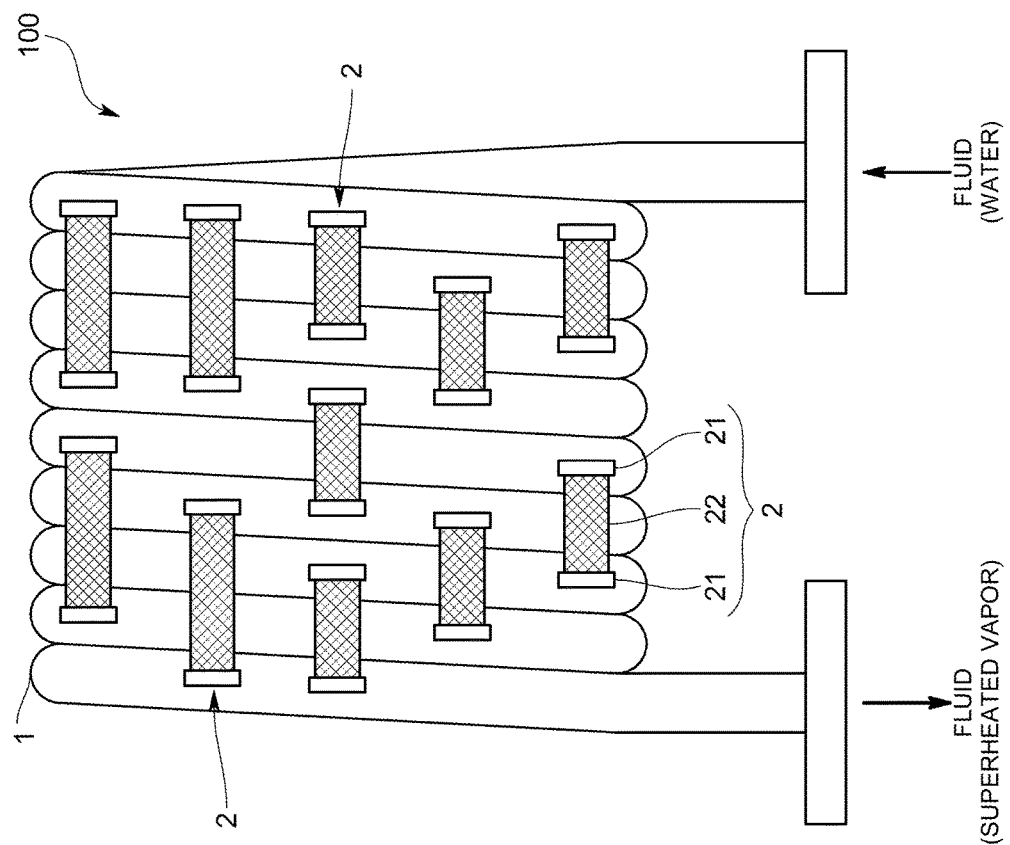
FIG. 2 is a side view mainly showing the conductor tube of this embodiment.

As shown in FIG. 2, in this embodiment an electrical connecting member 2 is provided that constitutes a short circuit by electrically connecting each of the predetermined portions of the conductor tube 1.

The electrical connecting member 2 is, as shown in FIGS. 3A-3C, made of a metal in an elongated shape, and comprises a pair of terminal plates for connection 21 that are both electrically and mechanically adhered to the conductor tube 1 by means of welding or the like and a metal mesh 22 that bridges over the terminal plates for connection 21. The above-mentioned pair of the terminal plates for connection 21 are both electrically and mechanically adhered to an outer circumferential part of the secondary coil of the conductor tube 1 by means of welding or the like. In addition, the metal mesh 22 stretches in accordance with a change of a distance between the terminal plates for connection 21. In this embodiment, the metal mesh 22 is in a shape of a belt that is bent in the middle and a plurality of (three in FIGS. 3A-3C) the metal meshes 22 bridge over the terminal plates for connection 21.

A plurality of (more than three in this embodiment) the electrical connecting members 2 are mounted on a surface of the conductor tube 1 in a posture wherein an extending direction of the electrical connecting member 2 is parallel to an axial direction of the helical shape. It is preferable that a plurality of the electrical connecting members 2 are mounted separately at intervals from each other over the whole outer circumference of the secondary coil. In FIG. 2, two or three electrical connecting members 2 are mounted linearly along the axial direction of the helical shape. In addition, the terminal plate for connection 21 of each electrical connecting member 2 does not connect to an adjacent conductor tube element (a part constituting one round of the helical shape of the conductor tube 1) but is mounted on a predetermined position of a conductor tube element that is located at a position that is separated by two or more so as to electrically connect to the conductor tube elements.

Both heat resistant and hardly oxidizable austenitic stainless steel such as SUS304 or SUS316L and INCONEL-alloy (JIS alloy number NCF601 or the like) are suitable as a material of the terminal plate for connection 21 or the metal mesh 22.

In accordance with this arrangement, since the electrical connecting member 2 transforms in accordance with a transformation of the conductor tube 1 resulting from the temperature change of the conductor tube 1, there is no chance of generating considerable stress for the conductor tube 1 or the electrical connecting member 2 itself or at a portion where the conductor tube 1 is fixed to the electrical connecting member 2 and it is possible to prevent accumulation of fatigue, resulting in prevention of breakage.

In addition, since the electrical connecting member 2 is made of the metal mesh 22 that is easily transformable not only in the longitudinal direction but also in the transverse direction, it becomes possible to sufficiently accommodate contingent transformation of the conductor tube 1.

Furthermore, since the heating temperature to produce the superheated vapor is high so that the conductor tube 1 transforms largely in this embodiment, the above-mentioned effect is especially remarkable.

This invention is not limited to the above-mentioned embodiment.

Figure 4B:
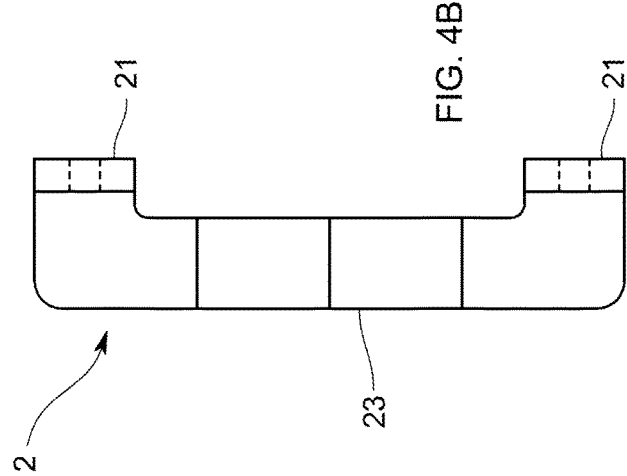
FIGS. 4A-4C are a front view, a bottom view, and a side view showing the electrical connecting member of another embodiment of this invention.
Figure 4A:
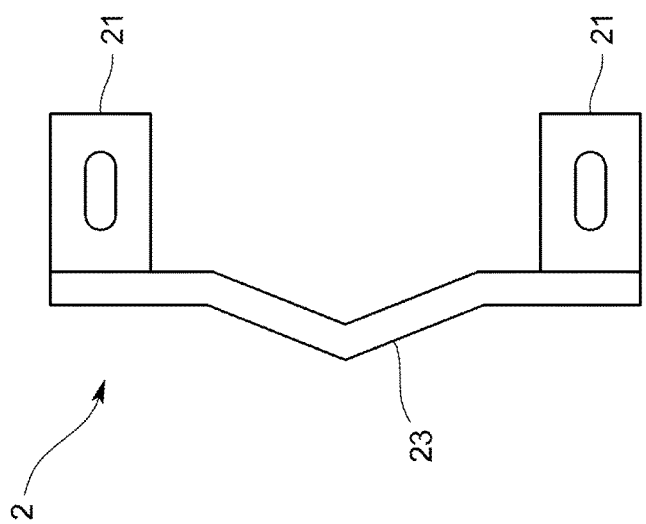
Figure 4C:
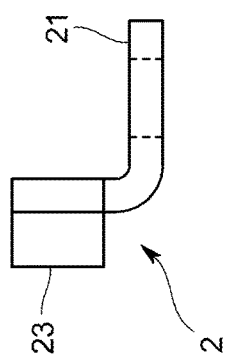

For example, the electrical connecting member 2 may be formed, as shown in FIGS. 4A-4C, by the use of a metal plate 23 with which a folded portion is provided between the terminal plates for connections 21. As the metal plate 23 with which the folded portion is provided, a metal plate may be provided with a bent portion or a curved portion. In accordance with this arrangement, it is possible to both give transformability to the metal plate and secure a large cross-sectional area of conductivity. It is preferable that a material of the metal plate 23 is the same as that of the above-mentioned metal mesh.

Figures 5A, 5B:
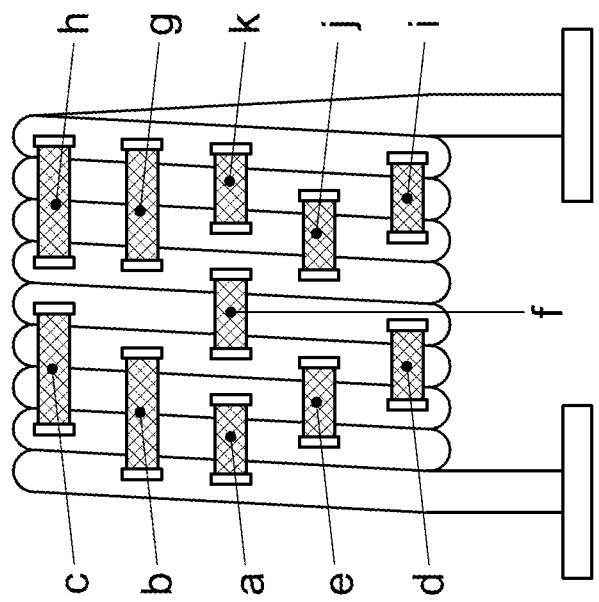
FIGS. 5A and 5B are views showing a result of an experiment of a value of an electric current flowing in the electrical connecting member at every portion on which the electrical connecting member is mounted.

In addition, it is preferable that a cross-sectional area and a number of connections of the electrical connecting members are set based on a value of an electric current that flows in the electrical connecting member for every portion where the electrical connecting member is mounted. FIGS. 5A and 5B show an example of a value of an electric current at a time of applying a rated voltage value to each of the electrical connecting members (a~k) shown in FIG. 2. The value of the electric current that flows in each of the electrical connecting members largely differs as shown in FIGS. 5A and 5B depending on a state of a magnetic coupling with an input side winding or due to a difference of impedance. If the cross-sectional area and the number of connections of the electrical connecting members are set in accordance with the value of the electric current, it is possible both to prevent excessive heating and to avoid selecting an excess cross-sectional area and number of connections.

Furthermore, the electrical connecting member in the above-mentioned embodiment is mounted in a posture with its extending direction parallel to the axial direction of the helical shape, in other words along the axial direction of the helical shape. However, the electrical connecting member may be mounted in a posture with its extending direction displaced from the axial direction of the helical shape. For example, the electrical connecting member may be mounted in a posture with its extending direction leaning from the axial direction of the helical shape within ±45 degrees (more preferably within ±10 degrees).

Furthermore, in addition to the induction heating method like the above-mentioned embodiment, the method of heating the fluid heating device may be an electric heating method wherein Joule heat is produced by directly flowing an electric current to the conductor tube that winds in a helical shape.

In addition, it is a matter of course that the present claimed invention is not limited to the above-mentioned embodiment and may be variously modified without departing from a spirit of this invention.

EXPLANATION OF REFERENCE CHARACTERS

100 . . . fluid heating device
1 . . . conductor tube
2 . . . electrical connecting member
22 . . . metal mesh
23 . . . metal plate

The invention claimed is:

1. A fluid heating device that applies heat to a fluid that flows in a conductor tube of a helical shape by applying induction heat or electrical heat to the conductor tube, comprising:
    an electrical connecting member that constitutes a short circuit by electrically connecting each of required portions of the conductor tube, wherein
    the electrical connecting member is transformable in accordance with a transformation resulting from a temperature change of the conductor tube,
    the electrical connecting member is formed by the use of a metal plate whose middle area is a bent portion, and
    the bent portion absorbs the temperature change of the conductor tube.

2. The fluid heating device described in claim 1, wherein the electrical connecting member is mounted on the conductor tube along an axial direction of the helical shape.

3. The fluid heating device described in claim 1, wherein a cross-sectional area and a number of connections of the electrical connecting member are set based on a value of an electric current that flows in the electrical connecting member for every portion where the electrical connecting member is mounted.

4. The fluid heating device described in claim 1, wherein the conductor tube generates superheated vapor by applying heat to the fluid.

5. A fluid heating device that applies heat to a fluid that flows in a conductor tube of a helical shape by applying induction heat or electrical heat to the conductor tube, comprising:
    an electrical connecting member that constitutes a short circuit by electrically connecting each of required portions of the conductor tube, wherein
    the electrical connecting member is transformable in accordance with a transformation resulting from a temperature change of the conductor tube, and
    the electrical connecting member is formed by the use of a metal mesh.

* * * * *